(12) United States Patent
Allen (10) Patent No.: US 9,255,023 B2
(45) Date of Patent: Feb. 9, 2016

(54) TREATMENT OF CONTAMINATED IMPOUND WATER

(71) Applicant: Stephen D. Allen, Eagle, ID (US)

(72) Inventor: Stephen D. Allen, Eagle, ID (US)

(73) Assignee: WATER SOLUTIONS, INC., Sioux Falls, SD (US)

( * ) Notice: Subject to any disclaimer, the term of this patent is extended or adjusted under 35 U.S.C. 154(b) by 14 days.

(21) Appl. No.: 13/839,951

(22) Filed: Mar. 15, 2013

(65) Prior Publication Data

US 2013/0270189 A1   Oct. 17, 2013

Related U.S. Application Data

(60) Provisional application No. 61/625,416, filed on Apr. 17, 2012.

(51) Int. Cl.
*C02F 9/00* (2006.01)
*C02F 1/44* (2006.01)
(Continued)

(52) U.S. Cl.
CPC . *C02F 9/00* (2013.01); *C02F 1/441* (2013.01); *C02F 1/444* (2013.01); *C02F 1/5236* (2013.01);
(Continued)

(58) Field of Classification Search
CPC .. B01D 37/03; B01D 39/1692; B01D 61/147; B01D 61/16; B01D 61/18; B01D 61/22; B01D 61/14; B01D 61/142; B01D 61/022; B01D 61/025; B01D 61/04; B01D 61/12; B01D 61/58; B01D 71/68; B01D 71/76; B01D 2257/00; B01D 61/02; B01D 61/08; B01D 36/008; B01D 33/35; B01D 33/41; C02F 1/441; C02F 1/444; C02F 1/5245; C02F 1/5272; C02F 1/56; C02F 1/64; C02F 1/722; C02F 1/725; C02F 1/78; C02F 9/00; C02F 2001/46; C02F 2101/203; C02F 2103/16; C02F 2103/10; C02F 2201/007; C02F 2209/06; C02F 2209/10; C02F 2305/026; C02F 2305/023
See application file for complete search history.

(56) References Cited

U.S. PATENT DOCUMENTS 3,931,007 A * 1/1976 Sugano et al. ................. 210/717
5,871,648 A * 2/1999 Allen et al. .................... 210/638
(Continued)

OTHER PUBLICATIONS

Flow Configuration; Hydranautics High Performance Membrane Products, 2001.*
(Continued)

*Primary Examiner* — Allison Fitzsimmons
(74) *Attorney, Agent, or Firm* — Kirton McConkie; Evan R. Witt (57) ABSTRACT

Systems and methods for treating contaminated impound water are disclosed which include a pretreatment stage wherein contaminated water is oxidized, pH adjusted, treated with a coagulant, and treated with a polymer to form a flocculent comprising bulk solids and fine particles. The oxidizing step may include two or more stages, one of which is a treatment with ferrous iron generated from iron filings or steel wool. Bulk solids are removed, and the liquid portion containing fine particles is applied to a low pressure microfiltration unit to remove the fine particles resulting in a microfilter effluent. The microfilter effluent may be directly fed to a reverse osmosis (R/O) unit. The R/O reject may be recycled to another R/O unit (second pass). The R/O permeate may be blended as needed with the microfiltration effluent to provide the final discharge effluent with reduced contaminant levels and maximized throughput. The R/O second pass reject water is further oxidized and recycled back to the front of the system to be retreated.

23 Claims, 7 Drawing Sheets

(51) Int. Cl.
  *C02F 1/52* (2006.01)
  *C02F 1/56* (2006.01)
  *C02F 1/72* (2006.01)
  *C02F 101/00* (2006.01)
  *C02F 101/10* (2006.01)
  *C02F 103/00* (2006.01)
  *C02F 103/10* (2006.01)

(52) U.S. Cl.
  CPC .............. *C02F 1/5245* (2013.01); *C02F 1/56* (2013.01); *C02F 1/725* (2013.01); *C02F 2101/006* (2013.01); *C02F 2101/103* (2013.01); *C02F 2101/106* (2013.01); *C02F 2103/007* (2013.01); *C02F 2103/10* (2013.01)

(56) References Cited

U.S. PATENT DOCUMENTS

| | | | |
|---|---|---|---|
| 6,428,705 B1* | 8/2002 | Allen et al. | 210/638 |
| 6,942,807 B1* | 9/2005 | Meng et al. | 210/719 |
| 2002/0003116 A1* | 1/2002 | Golden | 210/759 |
| 2002/0088759 A1* | 7/2002 | Krulik et al. | 210/723 |
| 2002/0113019 A1* | 8/2002 | Santina | 210/679 |
| 2006/0091077 A1* | 5/2006 | Haas et al. | 210/641 |

OTHER PUBLICATIONS

Water Treatment Guide: Technical Database for the Water Treatment Industry; Reverse Osmosis System Design: Concentrate Recycle Loop, 2007.*
Bergendahl et al. (Water Research 38 (2004) 327-334).*

* cited by examiner

LEGEND:

- pH INDICATOR
- RUPTURE DISC
- FLOAT SWITCH
- PRESSURE SWITCH
- PRESSURE TRANSDUCER
- PRESSURE INDICATOR
- PRESSURE RELIEF VALVE
- AIR/VACUUM RELEASE VALVE
- ——— LIQUID PROCESS STREAM
- ———— CHEMICAL STREAM
- ——— SOLIDS STREAM
- ELECTRONIC ACTUATED VALVE
- MANUAL VALVE
- CHECK VALVE
- CHEMICAL FEED PUMP
- PUMP
- FLOW METER
- STATIC MIXER
- SOLENOID VALVE

Fig. 7

TREATMENT OF CONTAMINATED IMPOUND WATER

CROSS-REFERENCE TO RELATED APPLICATION

This application claims the benefit of U.S. Provisional Patent Application No. 61/625,416, filed Apr. 17, 2012, which application is incorporated by reference.

FIELD OF THE INVENTION

The present invention relates to treating contaminated impound water to render it sufficiently clean to become canal grade quality water for reintroduction to the ecosystem. The present invention may be applied to impound agricultural water, hydraulic fracturing (frac'ing) effluent, and post anaerobic digested sludge effluent waste water.

BACKGROUND OF THE INVENTION

Tulare Lake Drainage District [TLDD] in Corcoran, Calif., has over 3,000 acres of impounded agricultural water and has been the subject of numerous studies for decades. This impounded water has been documented over the last several years as delineated in journals, web sites and newspapers. [www.water.ca.gov; Los Angeles Times (1994); University of California Center for Water Resources (2 studies), "*Management effects on Selenium Fractionation, Speciation and Bioavailability in Sediments from Evaporation Basins*" and "*Transformation of Selenium species in Sediment and Wetland Management for the Enhancement of Selenium Volatilization and Remediation Efficiency*"]; and the US Geological Survey studies. In addition to the above referenced studies and articles, several corporations have attempted to develop a systematic approach to treat the impound water and render it canal grade quality water for reintroduction to the ecosystem as agricultural based water mainly though redistribution of the water through the existing canals throughout central California.

The impounded water has several minerals and organics present that incorporate selenium, arsenic and uranium as contaminants of the impounded water and are in several forms, both as metallurgical and as organic species where selenium has been taken up by the bacteria, etc. as, e.g. seleno-methionine, seleno-cysteine and seleno-cystine, and are present in these forms to unacceptably high levels to prevent discharge as canal grade water.

Many of the studies have focused on traditional methods of eliminating the selenium, arsenic and uranium. For example, the University of California study on volatilization of the compounds as a method of eliminating the compounds from the impounded water. The focus of the studies, whether as private or public entities, has been on the elimination of the selenium analogs present in the water. [FAO (Food and Agricultural Organization) of the United Nations titled "*Agricultural Drainage Water Management in Arid and semi-Arid Areas*", FAO Irrigation and Drainage Paper 61]. In this study, they point out the arsenic and more importantly, the difficulty present in the treatment and the reduction of selenium in the impounded water from the region. Non-limiting examples of some of the selenium compounds are shown below:

Seleno-methionine; $SeCl_2$: selenium (II) chloride; $Se_2Cl_2$: selenium (I) chloride; and $[SeCl_4]_4$: selenium (IV) chloride.

The contamination problems similar to those of the Tulare Lake Drainage District discussed above, are present in many other forms of contaminated impound water such as impound agricultural water, hydraulic fracturing (frac'ing) effluent of gas wells, and post anaerobic digested sludge effluent waste water.

It would be an advancement in the art to provide systems and processing for impound water contaminated with metals such as selenium, arsenic, uranium, and other undesirable metal or ion, as well as organic species.

It would be an advancement in the art to provide systems and processes for treating contaminated impound water to render it acceptable for environmental discharge or industrial recycling.

BRIEF SUMMARY OF THE INVENTION

The present invention relates to treating contaminated impound water. The disclosed invention includes a process and system for treating contaminated impound water. The system and apparatus include a pretreatment stage wherein contaminated water is oxidized, pH adjusted, treated with a coagulant, and treated with a polymer. The coagulant may be an inorganic coagulant, such as an aluminum chlorohydrate-type coagulant. The polymer may be a low molecular weight polymer, typically in the 200,000 to 800,000 molecular weight range. The polymer may be a quaternized low molecular weight cationic polymer. The polymer is preferably a potable grade polymer. Non-limiting examples of suitable low molecular weight polymers include epi-dma and DAD-MAC polymers. The pretreatment to the contaminated water increases the physical size of contaminants and particulates in the contaminated water and to form a flocculent comprising bulk solids and fine particles.

Bulk solids are removed using a low-cost solids removal technique. Examples of such solids removal techniques include, but are not limited to, settling, filter press, centrifuge, belt press, and combinations thereof.

The liquid portion containing fine particles is applied to a low pressure deadhead microfiltration unit to remove the fine particles from the contaminated water resulting in a microfilter effluent. Typical operating pressures may range from 5 to 15 psi. Various microfiltration membranes can be used, including but not limited to polypropylene, polytetrafluoroethylene (PTFE), and polysulfone membranes. Other commercially available membranes may also be used, including membranes specifically designed for high salt concentrations, high heat, or high pressure (greater than the typical operation pressure noted above). The GFD [gallons per square foot of membrane] is typically in the 750 GFD to 1,100 GFD, high flow at low pressure across the membranes. The average particle sizing is 75-80 microns with 3 sigma [$3\sigma$] of particle distribution at 25-120 microns in physical size. The resulting reacted solution containing the now bound contaminants is low viscosity, low tackiness and highly dewatered, typically <15% as bound water. This allows for the particles to be held on the outside of the membrane and not pass through the membrane, and with low viscosity and low tackiness, be backwashed off the membrane with relatively low pressure water.

Following the pretreatment oxidation and flocculation chemistry is reacted with the influent wastewater, the settling and bulk solids separation, and the passage of particulate and liquid phases through the microfiltration membranes, the undesirable ions, metals, and complex contaminant levels are substantially reduced. In some cases the microfilter effluent is canal grade quality water. However, in other cases certain trace contaminants may remain at unacceptably high levels to be considered canal grade quality water. Nevertheless, due to the substantially reduced contaminant loading, the microfilter effluent is capable of being directly fed to a reverse osmosis (R/O) unit with little or no corrosion and little or no scaling of the membranes at the higher level of permeate, 75% to 80% permeate. The R/O reject may be recycled to another R/O unit (second pass) resulting in permeate level of about 50% to 60%.

The R/O treatment in combination with the microfiltration permit the final discharge effluent from the process to be a blend of the post microfiltration effluent and the R/O effluent (i.e., permeate) to reduce the contaminant levels and maximize the throughput of the system.

The R/O second pass reject water is recycled back to the front of the system to be retreated. However, before doing so, the R/O second pass reject water is oxidized. Non-limiting examples of such oxidation processes include, but are not limited to, persulfate, ozone, or hydrogen peroxide treatment.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of suitable inorganic coagulants, polymers, chemical concentrations, oxidation chemicals and techniques, solid separation and microfiltration methods, reverse osmosis processes, etc., to provide a thorough understanding of embodiments of the invention. One having ordinary skill in the relevant art will recognize, however, that the invention may be practiced without one or more of the specific details, or with other methods, components, systems, materials, and so forth. In other instances, well-known structures, materials, or operations are not shown or described in detail to avoid obscuring aspects of the invention.

Previous work done in the laboratory has shown the necessity for the oxidation of the selenium, either as a metal, ion species or as a selenium-containing amino acid, peptide or protein, to reduce or eliminate the selenium from the soluble ion, complex or coordinated selenium to the insoluble phase, making a particle, which is insoluble, and can be subsequently removed via a method, such as, microfiltration. The work herein details those experiments and the results from them. It is also well known that the other elements present, either as metals or as ions, also are more soluble in the oxidized state, As [arsenic], U [uranium], Mn [manganese], Ba [barium], etc.

Simple oxidation reagents, such as using ozone ($O_3$), hypochlorite (NaOCl), persulfates (($NH_4)_2S_2O_8$, $K_2S_2O_8$ or $Na_2S_2O_8$), peroxide ($H_2O_2$), or permanganate ($KMnO_4$) are some of the more conventional oxidants that may be used. However, it is presently preferred to utilize a more aggressive or advanced oxidation step in which $Fe^{2+}$ [ferrous] catalyzes the oxidation reagent. Non-limiting examples of such advanced oxidation include Fenton's reagent (peroxide catalyzed by $Fe^{2+}$ ions) and $Fe^{2+}$ catalyzed persulfate. Without being bound by theory, it is presently believed that the ferrous ions provide in situ regeneration of the active hydroxyl radical which is the functional oxidative intermediate used to oxidize the undesired metals, ions and organic species.

It is presently preferred to first treat the contaminated water with ferrous ions followed by one or more oxidation reagents, such as those identified above. In addition to assisting in the removal of undesired metals or ions, the advanced oxidation step works well for the organic species destruction, which is important to reduce or eliminate the organic seleno-species present in the impounded water at TLDD. This is a strict order of addition step, the metal (ferrous in this case) first, with a mix time of about 10 to 30 minutes, and then the addition of the oxidant. In laboratory tests, the reductions of the metals, ions and organics, is quite exceptional, with 99% reductions possible in cases studied so far, such as the aforementioned TLDD example for agricultural wastes. The selenium reduction, as a specific example, is >97.5% in most cases, and >90% in all cases, regardless of the state of the influent selenium species, including any selenium inclusive organic entities.

Figure 1:
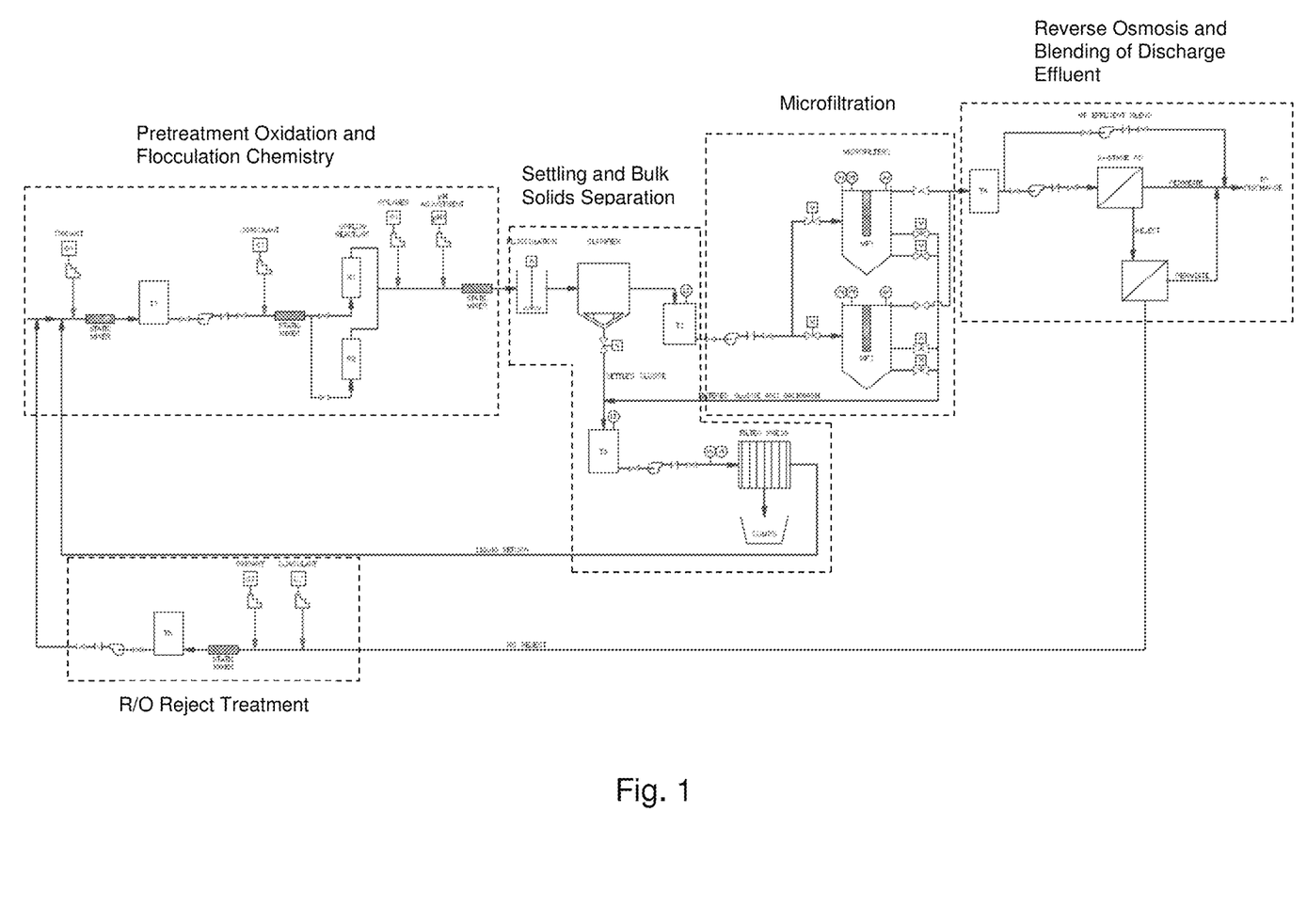
FIG. 1 depicts a flow chart of a representative embodiment of a system for treating contaminated impound water.
Figure 2:
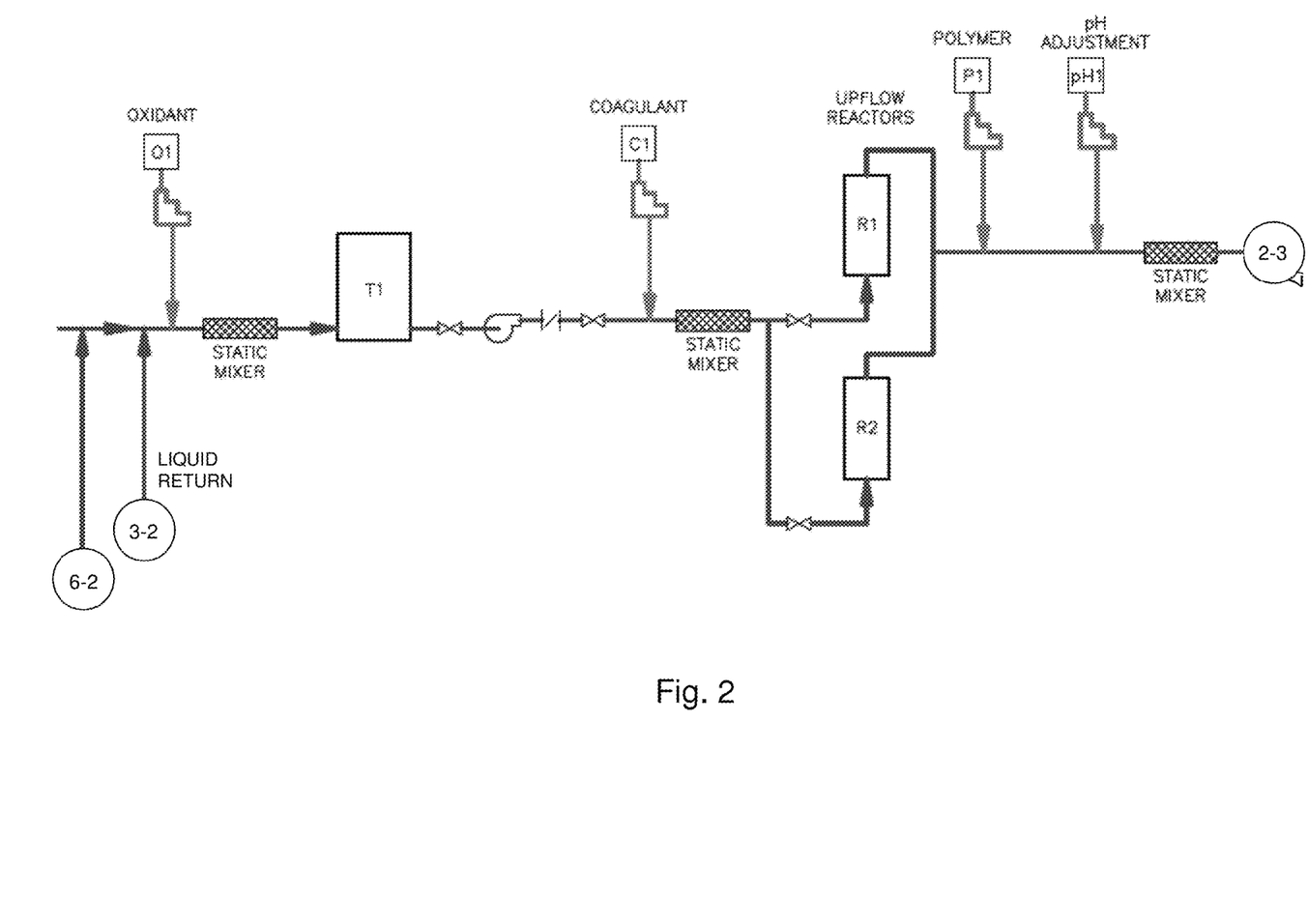
FIG. 2 depicts an enlarged view of the pretreatment oxidation and flocculation chemistry unit of the overall system shown in FIG. 1.

The ferrous ions may be generated or regenerated in one or more columns that contain iron filings or steel wool. The generation of the ferrous ($Fe^{2+}$) is accomplished through the in situ reduction of the ferric ($Fe^{3+}$) in columns called upflow reactors (see FIG. 2, R1 and R2). These upflow reactors contain the iron filings or steel wool and contact the ferric iron to produce sufficient ferrous compounds to provide the advanced oxidation required for the ion and organic species. The ferric ions are reduced to form ferrous, while the iron filings or steel wool oxidize to form additional ferrous. A source of ferric ions may be introduced to the waste water stream with coagulant at point C1 shown in FIG. 2. Even though FIG. 2 shows the sequence of oxidant O1 treatment prior to the ferrous treatment, the invention is not limited to the sequence shown in FIG. 2. It is within the scope of the disclosed invention to treat the contaminated water with ferrous ions followed by treatment with one or more oxidants.

In some non-limiting embodiments, a ratio of ferrous ions ($Fe^{2+}$) to contaminant metal ions in the contaminated water is between about 2.4:1. In some non-limiting embodiments, a ratio of ferrous ions ($Fe^{2+}$) to oxidizable organics in the contaminated water is also between about 2.4:1.

The optimum pH for these reactions to proceed is slightly acidic, but it is also quite active at alkaline pH's, provided the buffering capacity of the solution is high enough (mole ratio of pH modifier to the persulfate), requiring excess buffering capacity for alkaline based reactions. Sodium or potassium hydroxide (NaOH or KOH), calcium or magnesium hydroxide ($Ca(OH)_2$ or $Mg(OH)_2$), and calcium or magnesium oxide (CaO or MgO) are acceptable. Therefore the initial portion of the mechanical would be configured as:

pH adjustment→
$Fe^{2+}$→oxidant→
   pH adjustment→
      inorganic coagulant and organic polymer addition→
         settling.

The settling portion is for the separation, if required, but it is not mandatory, for the particles formed to be concentrated and dealt with as semi-solids (at this stage) though mechanical filtration/separation such as, filter press, centrifuge, or belt press, as examples. The liquid portion is then applied to the microfilter, a dead head, low pressure microfiltration unit. The chemistry of the coagulant and the polymer are selected to increase the flow through the microfilter.

One non-limiting example of inorganic coagulant chemistry that may be used aluminum chlorohydrate compounds such as:

$$Al_n(OH)_{2n-m}Cl_m$$

Wherein 'n' may range from 3 to 6 and 'm' may range from 1 to 2; the Al:Cl ratio may range from about 3:1 up to 6:1. One non-limiting example, 'n' is 6 and 'm' is 1, such that the coagulant is $Al_6(OH)_{11}Cl$.

There are several other coagulant compounds that could be used and the above is only a non-limiting example. Other coagulant compounds include, but are not limited to, aluminum sulfate $[Al_2(SO_4)_3]$, aluminum chloride $[AlCl_3]$, poly-aluminum chloride, ferric chloride $[FeCl_3]$, ferric sulfate $[Fe_2(SO_4)_3]$, and the above mentioned ferrous analogs, ferrous chloride or ferrous sulfate, silicates, dithiocarbamate, and dithiocarbonic acid.

In some non-limiting embodiments, the inorganic coagulant has an initial concentration in the contaminated water between about 30 mg/L and about 180 mg/L. In other embodiments, the inorganic coagulant has an initial concentration in the contaminated water between about 40 mg/L and about 70 mg/L.

The organic polymer may have a low molecular weight, typically in the 200,000 to 800,000 molecular weight range. The polymer may be a cationic polymer, such as a quaternized polymer. The polymer is preferably a potable grade polymer. One non-limiting example of a suitable low molecular weight polymer is epi-dma, a condensation product of epichlorohydrin and dimethylamine having the general description:

where the molecular weight is typically between 200,000 and 800,000.

Epi-dma polymers are presently preferred, but other polymers, including but not limited to, DADMAC, diallyldimethyl ammonium chloride or linear or branched polyamines in design may be used. Typical molecular weights may range from about 200,000 to 800,000 for each polymeric product. The preferred molecular weight may be affected by the particular contaminants to be removed. By way of non-limiting example, when using epi-dma for the metals and some ions, 240,000 to 280,000 molecular weight is preferred; for the organics, the molecular weight should be a little higher, around 350,000 to 400,000 molecular weight. A good workable range is from about 200,000 to 400,000 molecular weight. A more preferred range is from about 250,000 to 350,000 molecular weight. For DADMAC polymers, the preferred molecular weight is usually a little higher compared to the epi-dma. So for DADMAC polymers a preferred range may be from about 450,000 to near 550,000 molecular weight.

In some non-limiting embodiments, the organic polymer has an initial concentration in the contaminated water between about 10 mg/L and about 60 mg/L. In other embodiments, the organic polymer has an initial concentration in the contaminated water between about 15 mg/L to 30 mg/L.

A typical ratio of inorganic coagulant to low molecular weight polymer may be in the range of 3:1 (inorganic:organic) to 22:1 (inorganic to organic). In some embodiments the ratio of inorganic coagulant to low molecular weight polymer is in the range of 5:1 to 15:1. In other embodiments, the ratio of inorganic coagulant to low molecular weight polymer is in the range of is 8:1 to 12:1 (inorganic to organic). The breadth of these ranges is due to the individuality of the influent contaminant loading.

The pH adjusting compounds can be from any of the standard acids and bases, including, but not limited to, the acids $H_2SO_4$, HCl or $HNO_3$, and the bases, NaOH, KOH, $Ca(OH)_2$, $Mg(OH)_2$, CaO, MgO, or similar.

This post reacted material is then subjected to what is referred to as microfiltration, which is a polypropylene, or Teflon™ based or polysulfone (but not limited to) membrane which under low pressure is able to be filtered at high rates of flow in excess of 750 gallons per square foot of membrane per day, or GFD.

The following benefits are incorporated into the design and manufacturing of the system and process.

1. Chemical pretreatment creates a particle that is larger than the pore size of the microfiltration membrane. Only particles smaller than the pore size can pass through the membrane. Thus, chemical pretreatment and membrane selection are integrated to form a positive barrier to the passage of contaminates.

2. With proper reactions in the pretreatment, a particle is created of known size. The membrane has a known pore size. The particle formation reaction and the separation are physical in nature, based on science, and repeatable.

3. Due to the scientific nature of the reactions, the usage of chemicals to achieve the desired reaction, the pretreatment is minimized. There is no need to create a particle which will settle, only a particle with predetermined size.

4. Less pretreatment chemistry means less sludge/solids. Additives to increase the weight of the particle such as lime or magnesium are eliminated, thereby decreasing the sludge generation. However, because of the unique nature of these reactions, the solids generated are expected to exceed 20% solids.

5. Demonstrated flux for systems with similar contaminants loading is 450-550 GFD, nominally. Based upon a similar system in commercial operation, the actual flux may exceed >600 GFD. At that flux, the filter vessel will provide 1,000 gpm. Due to the minimal solids loading of the membranes, it is expected that the actual flux of a large operating system will be higher.

6. Should the end-user determine the need for additional operations or flow, added membranes and vessels can be placed in operation.

7. The system operating pressure is typically in the range of about 5 to 15 psi. As a result, the electrical costs associated with the operation of the system are minimized. The lower operating pressure allows a greater amount of sludge/solids to buildup on the membrane surface without lowering the flow rate of the system. The vessel is protected from over pressurization by a pressure relief valve.

Under level control, the collected waste streams may be pumped to the reaction tanks at a rate of 600-800 gpm. Under pH controls acid or base can be added (optional), if necessary, to raise or lower pH to the set point, while proprietary a suitable inorganic coagulant is added under volumetric and automatic BOD control and concentration (titrametric) control. It is important that there be at least 10 minutes of retention time in the reaction tanks. The reaction vessels will be equipped with mixers. pH controllers and inline monitors are preferably provided to permit process automation. The user ensures that the wastewater and coagulant are properly fed to the first reaction tank. The pretreated wastewater passes to the settling bulk solid separation system. Under level control provided with the system, the waste feed pump will ensure that the level of the feed tank remains within the requirements for continuous operation of the settling to the filter vessel. A single skid may be provided, mounting control panel, pumps and associated valves. The filter vessel may be stand-alone. The settling and the filter vessel are installed spares, which allow for the maintenance and cleaning without interruption of the process plant waste flow. The generated sludge is collected and concentrated in the settling system where it is ready to be sent to a centrifuge for dewatering. The filtrate is available for return to the process or discharge to drain, meeting or exceeding all discharge requirements. The cleaning of the system will be on line with provisions for alternate remote cleaning. The system will have stand-alone control panel with automatic, remote automatic or local operation possible.

The microfiltration membranes can be of several formulations, polypropylene, polytetrafluoroethylene [PTFE, aka: Teflon™], polysulfone, or several other membranes specifically designed for high salt concentrations, high heat [>75° C.] or higher pressure [exceeding the normal 5-15 psi], as examples. As described above, the benefits of the chemistry and the membrane are the high flow through the system and the low pressure of [the flow through the] membranes due to the formation of the particles through the chemistry design. The gallons per square foot of membrane per day (GFD), in these examples, exceeds 750, extremely high flow at low pressure (polypropylene membranes). The typical size of the pores in these membranes is 1.0 micron nominal, and 2.2 micron absolute for passage of particulate [>99.7% of all particulate is held on the surface of the membrane].

The low filtration pressure allows for the particles to be held on the outside of the membrane and not pass through the membrane. Because the particles have low tackiness, they may be backwashed off the membrane with relatively low pressure water. The typical backwash procedure is composed of several steps: $1^{st}$ step is the shut down of the influent wastewater, the $2^{nd}$ step is approximately 1 minute no flow in or out of the microfilter, the $3^{rd}$ step is opening of the effluent stream valve to allow backwash water, such as filtered water, to flow back to the membrane and backflush the solids/microfines>2.2 microns in physical size, and the $4^{th}$ step is provide time, approximately 1 to 2 minutes for the particulate to settle, the $5^{th}$ step is for the valve at the base of the microfiltration unit to open and remove the solids/fines from the backwash of the filters, and the $6^{th}$ step is to reopen the influent wastewater valve and continue flow. The variations in time, for opening, settling and removal is based on the amount of solids present in the wastewater and on the surface of the filters. Each of the units installed may be customized for the particular set of solids values present in the wastewater.

Figure 3:
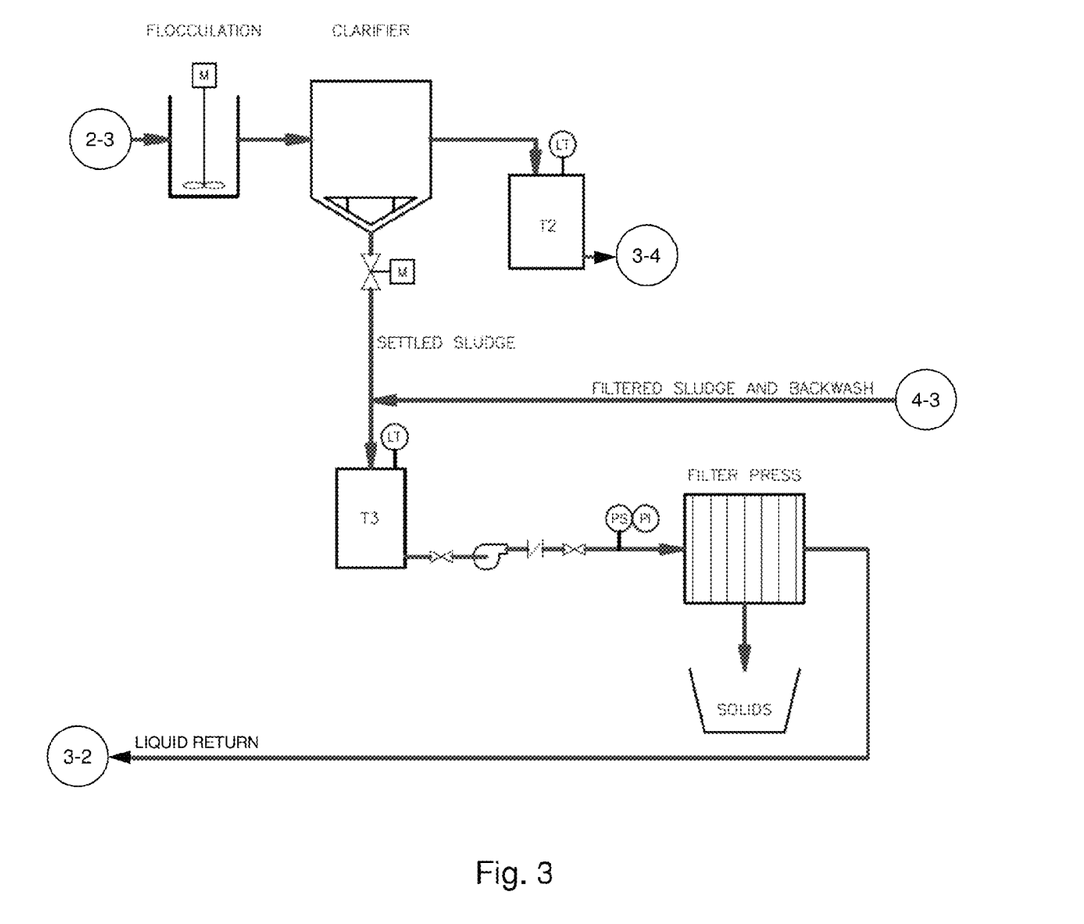
FIG. 3 depicts an enlarged view of the settling and bulk solids separation unit of the overall system shown in FIG. 1.
Figure 4:
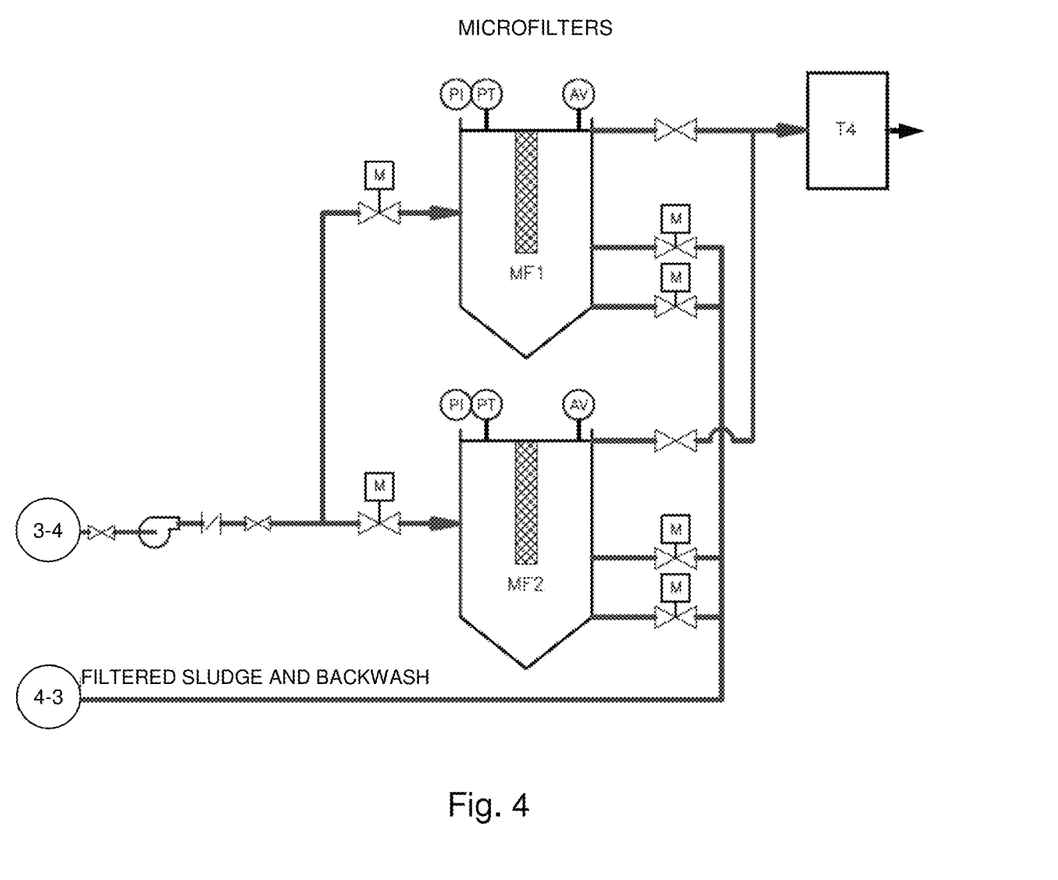
FIG. 4 depicts an enlarged view of the microfiltration unit of the overall system shown in FIG. 1.
Figure 5:
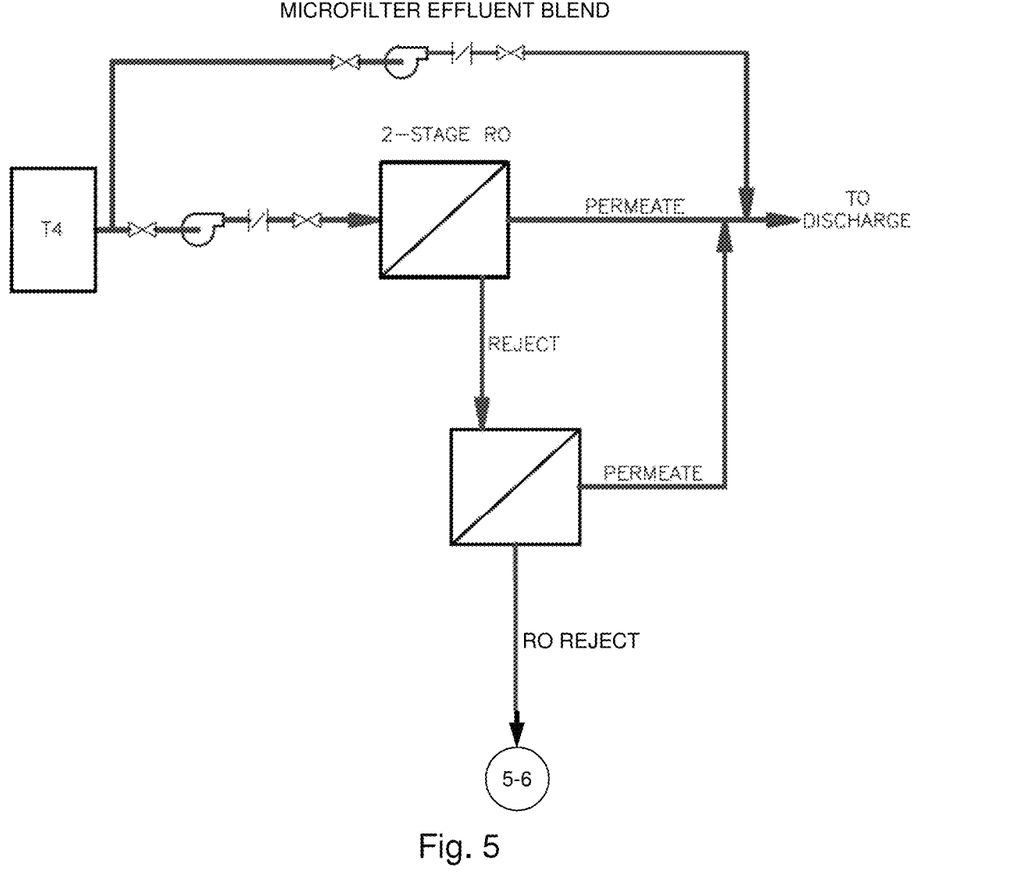
FIG. 5 depicts an enlarged view of the reverse osmosis and blending of discharge effluent unit of the overall system shown in FIG. 1.

Once the oxidation and the flocculation chemistry is reacted with the influent wastewater (FIG. 2), settling has occurred (FIG. 3) and the passage of the particulate and liquid phases through the microfiltration membranes (FIG. 4), eliminating the ions, metals and complex contaminant levels, the treated wastewater is then sent to a further processing, for example, a reverse osmosis [R/O] unit (FIG. 5). Due to the substantially reduced contaminant loading from the effluent of the microfilter, the feed to the reverse osmosis unit is capable (by Langlier and Ryzner indices) of direct filtration with little or no corrosion and little or no scaling of the membranes at the higher level of permeate, 75-80% as permeate.

On aspect of the disclosed invention deals with the recycling of the water from the reverse osmosis which is from a second reverse osmosis unit (so-called second or 2 pass reverse osmosis) of taking the reject water, 20-25% of now concentrated wastewater from the first pass R/O and treating this with another R/O based on higher concentrations of the salts, organics, etc. from the first pass [referred to as a desalinization R/O typically]. This is typically 50-60% of the first pass R/O as permeate and as reject. The balance therefore is as follows:

For a theoretical 1,000 gallons per minute [gpm] system:

$1^{st}$ pass R/O at 75% permeate and 25% reject; 1,000 gpm influent→750 gpm of clean water and 250 gpm of reject water.

$2^{nd}$ pass R/O at 60% permeate and 40% as reject; 250 gpm influent→150 gpm as clean water and 100 gpm as reject water.

Figure 6:
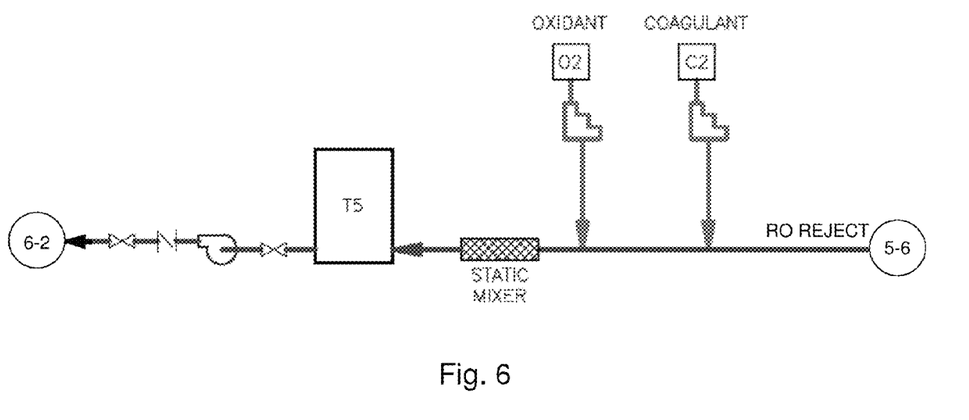
FIG. 6 depicts an enlarged view of the reverse osmosis reject effluent treatment unit of the overall system shown in FIG. 1.
Figure 7:
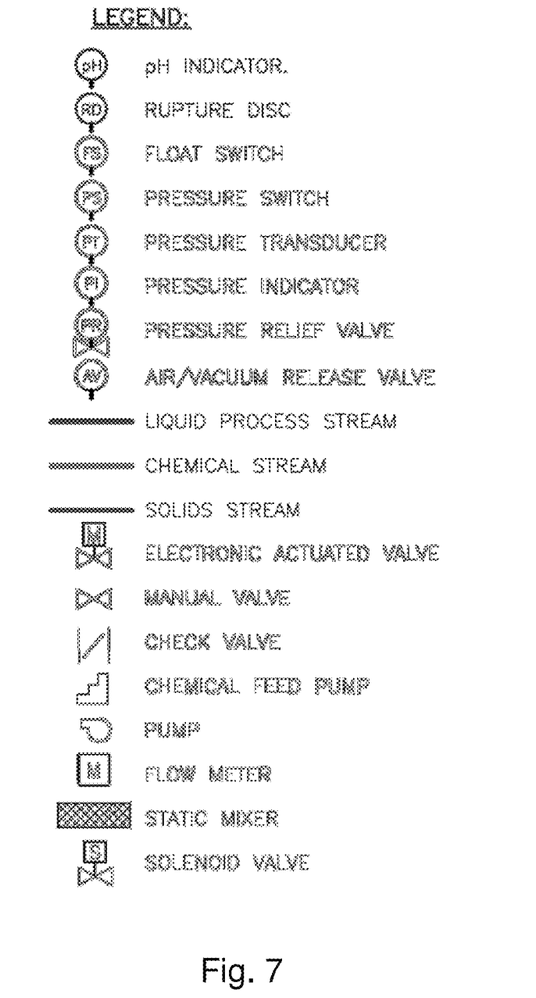
FIG. 7 depicts a legend of symbols and component parts of the system shown in FIG. 1.

The total clean water from the permeate is therefore: 900 gpm and the reject is 100 gpm The 100 gpm of the second pass reject is then recycled back to the front of the system to be retreated, but as it is collected it is treated further by oxidation and/or by advanced oxidation (FIG. 6), selected from one of a series of processes, persulfate, ozone or hydrogen peroxide all listed above, along with their reactions. The use of ozone in this oxidation treatment is presently preferred. Ozone has been shown to effectively destabilize the total dissolved solids (TDS) under the typical reaction conditions disclosed herein. Ozone is also a more aggressive form of oxidation for any organics remaining and for the compounds, e.g. sulfo-ligninates, humates as shown through the generation of the substantial increase in the carboxylic functions (splitting organic ring structures with subsequent formation of carboxylic groups). Over time, this becomes a critical function, as the TDS will begin to build up during the recycle and R/O second pass, reject water continues to be recycled.

The elimination of the ions, specific to the contaminant loading as to the chemical pretreatment, can be targeted to, for example, elimination or reduction of, sulfates, nitrates, phosphates or complexed metals and or organics, e.g. those specific to post anaerobic digested solids or specific to a blackstrap molasses rum plant (biotins, cellulosics or hemicellulosics and or dextrans, etc.) or specific or other agricultural or manufacturing process. This targeting of specific contaminants then enables the disclosed invention to eliminate the contaminants in the form of microfine solids [0.5-50.0 micron particulate formed] which can then be reincorporated into the influent for pretreatment again, as part of the system. [See flow stream 6-2 shown in FIGS. 2 and 6]. The microfine solids are oxidized and further treated by the process as described above for solids sufficient to either be directly applied to the microfilter or to be removed via a solids removal system such as a lamella settler or a other mechanical means.

By this incorporation of additional treatment, like the R/O, it allows for the blending of the final effluent from the process, of the direct post microfiltration process and the R/O effluent (aka: permeate) to reduce the contaminant levels and maximize the throughput of the system. In the case of, as an example only, Tulare Lake Drainage District (TLDD), the dilution of the effluent from the microfilter would be 4 volumes of microfilter to 1 volume of the R/O permeate. Taking arsenic as an example, at 7 µg/L effluent from the microfilter, the R/O permeate which is 0 µg/L would then yield at 4:1 microfilter to R/O permeate effluent discharge, 5.6 µg/L final effluent or discharge to environment, below the normally acceptable 10.0 µg/L discharge. The same would hold true for the selenium and for the uranium. This, of course, means substantially lower capital equipment cost allocated to the system for the R/O, for example, and puts the higher burden on the microfilter, the chemistry and mechanical portion, to make this work maximally.

The following examples and experimental results are given to illustrate various embodiments within the scope of the present invention. These are given by way of example only, and it is understood that the following examples are not comprehensive or exhaustive of the many types of embodiments of the present invention that can be prepared in accordance with the present invention.

EXAMPLES

Example 1

In one example of a method for treating contaminated impound water, a pilot scale test was performed using actual contaminated impound water from TLDD. A water sample was received from Tulare Lake Drainage District [TLDD] for analysis (pre and post), and treated in accordance with the disclosed process. The sample was treated using the advanced oxidation of catalyzed peroxide and ferrous ions. Advanced oxidation refers to processes employing ferrous compounds to catalyze oxidation of metals, ions, and organics in the waste water stream. Ferrous ions are generated in the upflow reactors (R1 and R2 shown in FIG. 2). Ferric iron is reduced from ferric to ferrous, and the iron filings or iron wool is oxidized. The ferric iron may be in the form of ferric chloride or other ferric salt. Not all of the iron is reduced from ferric to ferrous, because of the speed through which the ferric chloride, etc. passes through the upflow reactor. However, it is possible to predict an approximate amount of conversion to the ferrous and the subsequent flow of that analog to the reaction tanks and retention.

The results are disclosed in Table 1. All values herein are in milligrams per liter, denoted mg/L (or equivalent, parts per million or ppm) unless otherwise noted and are the corrected final values. In the case of arsenic, selenium and the WSI treated uranium, these are low level analysis [graphite furnace atomic absorption spectroscopy] and are in micrograms per liter (µg/L).

TABLE 1

| Test | Influent from TLDD | Post Treatment |
|---|---|---|
| Nitrate (as N) | 22.9 | 8.9 |
| Ammonia Direct (as N) | 0.070 | <0.050 |
| Nitrogen (Kjeldahl, TKN) | 3.08 | $3.70^A$ |
| Total Phosphate (as P) | 1.02 | <0.050 |
| Chloride (Cl) | 1,230.0 | 1,590.0 |
| Sulfate ($SO_4$) | 3,430.0 | 2,470.0 |
| Phenols | n/a | |
| Residue (total solids, TS) | 7,720 | 6,220 |
| Total suspended solids (TSS) | 16.0 | <10.0 |
| Total dissolved solids (TDS) | $3.35 \times 10^3$ | $2.75 \times 10^3$ |
| Total Organic [Oxidizable] Carbon (TOC) | 31.0 | 30.0 |
| Chemical Oxygen Demand (COD) | 50.8 | 88.0 |
| Biochemical Oxygen Demand (BOD) | <17.0 | <7.0 |
| Turbidity (NTU) | 5.6 | 0.55 |
| pH | 7.38 | 7.94 |
| Aluminum (Al) | 0.420 | <0.100 |
| Antimony (Sb) | <0.100 | <0.100 |
| Arsenic (As) | $0.100^C$ | 0.011 |
| Arsenic (low level, $GFAA^D$) | 100.0 µg/L | 7.0 µg/L |
| Barium (Ba) | <0.050 | <0.050 |
| Beryllium (Be) | <0.005 | <0.005 |
| Boron (B) | 4.550 | 2.180 |
| Cadmium (Cd) | <0.005 | <0.005 |
| Calcium (Ca) | $256.00^C$ | 201.70 |
| Chromium (Cr) | <0.050 | <0.050 |
| Cobalt (Co) | <0.020 | <0.020 |
| Copper (Cu) | <0.010 | <0.010 |
| Iron (Fe) | 0.240 | <0.050 |
| Lead (Pb) | <0.050 | <0.050 |
| Magnesium (Mg) | $192.00^C$ | 111.00 |
| Manganese (Mn) | 0.110 | 0.090 |
| Molybdenum (Mo) | 0.650 | 0.170 |
| Nickel (Ni) | <0.020 | <0.020 |
| Potassium (K) | 17.700 | 11.400 |
| Selenium (Se) | $<0.050^C$ | |
| Selenium (low level, $GFAA^D$) | $<25.0$ µg/$L^E$ | $<25.0$ µg/$L^E$ |
| Silicon (Si) | $20.040^C$ | 2.480 |
| Sodium (Na) | 2,600.00 | 1,980.0 |
| Strontium (Sr) | $2.470^C$ | 1.030 |
| Thallium (Tl) | 0.150 | <0.100 |
| Tin (Sn) | <0.200 | <0.200 |
| Titanium (Ti) | <0.100 | <0.100 |
| Uranium (U) | $0.680^C$ [680 µg/L] | 7.0 µg/L |
| Vanadium (V) | <0.050 | <0.050 |
| Zinc (Zn) | <0.010 | <0.010 | n/a: not applicable
TBD: to be done, in process
$^A$TKN, total Kjeldahl nitrogen is reported as being slightly higher and is due to the overfeed of the organic polymer, a linear polyamine which reports as TKN. Dose adjustments will be required on site to minimize the residual of the polymer, which should be zero as additive to the TKN.
$^C$Target elements for removal/reduction
$^D$GFAA is graphite furnace atomic absorption
$^E$The minimum accurate detection limit is quoted at 25 micrograms per liter, although this can be read accurately below that value, as the influent and the effluent shows by GFAA, the value is essentially, well below the minimum detectable level. Actual concentration below 25 µg/L is unknown.

The original targets were arsenic (As) and [primarily] selenium (Se) as the elements requiring the reductions to acceptable discharge levels as per our presubscribed and delineated pilot program. As is evident, Table 1 lists 15 separate elements or ions requiring reduction. Some of these elements are listed for process purposes, others for discharge reasons, but all requiring some substantial level of reductions. Seven of these elements are labeled $^C$ which stands for critical, that is, elements critical to either discharge or processing.

Results and Conclusions:

The disclosed process works very well. The levels of arsenic (As), selenium (Se) and uranium (U) were reduced to below the detectable limits or right at the detectable limits for the metals. In addition, one of the more important parts of the process was to reduce the total dissolved solids (TDS) and total solids (TS) for and as pretreatment of the solution for further processing such as reverse osmosis or ion exchange. The process may be successfully applied to the contaminated impound water of the Tulare Lake Drainage District. Importantly, the final values for the uranium showed a 99% reduction on the first pass. This would indicate a strong reason to believe the disclosed process could capture all of the influent uranium with appropriate process optimization.

Areas Needing Some Further Development:

Total solids reductions could be more than 20% with further characterization of the chemistry optimization.

Example 2

In another example of a method for treating contaminated impound water, testing was performed using actual selenium contaminated impound water from a coal surface mining operation.

These samples were received and labeled VE-78-2011-07-SE and VE-78-2011-08-SE and were, by our analytical determined to be from the same source and/or very close or very similar waste streams, if not the same grab sample. The two were blended together [failing any additional comments/instructions to the contrary] and were tested as a composite and labeled as VE-78-2011-07-SE. All values herein are in milligrams per liter [mg/L] unless otherwise noted.

The results are disclosed in Table 2.

TABLE 2

| Test | Influent VE-78-2011-07-SE | Influent VE-78-2011-08-SE | Treated |
|---|---|---|---|
| Residue (total solids, TS) | 5,040.0 | 4,680.0 | 5,170.0 |
| Total suspended solids (TSS) | <3.0 | 9.0 | <3.0 |
| pH | 1.66 | 1.66 | 8.21 |
| Aluminum (Al) | 0.160 | 0.320 | <0.100 |
| Antimony (Sb) | <0.100 | <0.100 | <0.100 |
| Arsenic (As) | <0.050 | <0.050 | <0.050 |
| Barium (Ba) | <0.050 | <0.050 | <0.050 |
| Beryllium (Be) | <0.005 | <0.005 | <0.005 |
| Boron (B) | <0.100 | <0.100 | <0.100 |
| Cadmium (Cd) | <0.005 | <0.005 | <0.005 |
| Calcium (Ca) | 201.0 | 199.0 | 204.0 |
| Chromium (Cr) | <0.050 | <0.050 | <0.050 |
| Cobalt (Co) | <0.020 | <0.020 | <0.020 |
| Copper (Cu) | <0.010 | 0.020 | <0.010 |
| Iron (Fe) | 0.370 | 0.110 | <0.050 |
| Lead (Pb) | <0.050 | <0.050 | <0.050 |
| Lithium (Li) | <0.100 | <0.100 | <0.100 |
| Magnesium (Mg) | 247.0 | 246.0 | 451.01 |
| Manganese (Mn) | <0.050 | <0.050 | <0.050 |
| Molybdenum (Mo) | <0.050 | <0.050 | <0.050 |
| Nickel (Ni) | <0.020 | <0.020 | <0.020 |
| Potassium (K) | 23.90 | 21.70 | 29.30 |
| Selenium (Se)2 | 0.048 | 0.048 | <0.005 |
| Silicon (Si) | 2.370 | 2.500 | 0.140 |

TABLE 2-continued

| Test | Influent VE-78-2011-07-SE | Influent VE-78-2011-08-SE | Treated |
|---|---|---|---|
| Sodium (Na) | 56.30 | 55.70 | 55.10 |
| Strontium (Sr) | 1.670 | 1.650 | 0.255 |
| Thallium (Tl) | <0.100 | <0.100 | <0.100 |
| Tin (Sn) | <0.200 | <0.200 | <0.200 |
| Titanium (Ti) | <0.100 | <0.100 | <0.100 |
| Vanadium (V) | <0.050 | <0.050 | <0.050 |
| Zinc (Zn) | 0.400 | 0.430 | <0.010 |

$^1$The pH was readjusted using magnesium oxide in the dry form
$^2$Se, selenium, and arsenic can be difficult to read by conventional ICP, inductively coupled plasma. The readings are, at varying times, quite variable. The value reported above is done by graphite furnace atomic absorption and is considered to be a very accurate value.

Some non-limiting examples of oxidation reactions that may be used in the disclosed systems and process include:

KMnO$_4$ reactions:

$$MnO_4 + 2H_2O + 4e^- \rightarrow MnO_2 + 4OH^- \text{ redox}=2.7\text{ V}$$

Fenton's Reagent Reactions $$Fe^{2+} + H_2O_2 \rightarrow Fe^{3+} + .OH + OH^-$$

$$Fe^{3+} + H_2O_2 \rightarrow Fe^{2+} + .OOH + H^+$$

$$.OH + H_2O_2 \rightarrow .OOH + H_2O$$

$$Fe^{3+} + .OH \rightarrow Fe^{2+} + OH^-$$

$$Fe^{3+} + HO_2 \rightarrow Fe^{2+} + O_2H^+$$

$$Fe^{2+} + O_2H + H^+ \rightarrow Fe^{3+} + H_2O_2$$

$$HO_2 + HO_2 \rightarrow H_2O_2 + O_2$$

Persulfate and Transition Elements $$S_2O_8.^- + Fe^{2+} \rightarrow SO_4.^- + [SO_4.^- + SO_4^{2-}] \text{ redox}=2.6\text{ V}$$

$$2Fe^{2+} + S_2O_8^{2-} \rightarrow 2Fe^{3+} + 2[SO_4]^{2-} \rightarrow Fe^{3+} + 3H_2O \rightarrow Fe(OH)_3[\text{as ppt}] + 3H^+$$

While the described systems and processes have proven particularly useful for treating contaminated impound agricultural water, the skilled artisan will recognize that the described systems and methods may be modified to treat contaminated water from a variety of sources, including, but not limited to, industrial wastewater sources, sewage sources, water treatment plants, anaerobic digesters, and any other suitable source.

The described systems and processes may provide some or all of the following advantages:

1. Oxidation of the contaminant loading, as metals, ions, organics and the free passage of the oxidized solution through the microfiltration membranes and no damage to the membranes. pH's can vary as well as the types of oxidants used, from pH 3 to as high as pH 12. The ability to change the membranes and the oxidation chemistry is extremely important as the quality of the influent water changes over time, location and sources of the impounded water.

2. Reductions of >90% and in some cases of >97% of selenium, arsenic and uranium (only as examples) through the membranes due to the oxidation and the chemistry applied for particle formation.

3. High flow through the membranes as measured in gallons per square foot per day, or GFD, exceeding 750 GFD and having >1,000 GFD.

4. Process design for recycling the second pass reverse osmosis for regeneration and re-reaction in the initial phase of the treatment, including the reduction of the TDS, ions, organics.

5. pH can be as low as 3 and as high as 12 for the reactions to take place and for maintenance of the integrity of the membranes.

6. Oxidation and particle creation of the second pass R/O solution with high total solids from the first and second pass R/O's and retreatment of that solution with further elimination or reduction of total solids through the microfilter and subsequent reentry into the R/O, 1st and 2nd pass.

7. Removal of targeted ions, specifically, sulfates, nitrates and phosphates.

8. Removal of metals, such as arsenic, selenium and uranium.

9. Reduced footprints and substantially lower capital costs.

10. High throughput of the influent wastewater and higher levels of blending are possible of the treated influent through the microfilter and the addition of the R/O permeate.

11. Flexible applications from blackstrap molasses fermented post anaerobic digested production, to agricultural impounded water, to wastewater from the hydraulic fracturing of gas wells.

While specific embodiments and examples of the present invention have been illustrated and described, numerous modifications come to mind without significantly departing from the spirit of the invention, and the scope of protection is not in any way limited by any of the aforementioned examples or embodiments. Instead, the scope of the protection is only limited by the scope of the accompanying claims.

The invention claimed is:

1. A method for treating contaminated impound agricultural water, the method comprising:
    providing contaminated impound agricultural water containing metal ion and organic species contaminants to be removed;
    treating the contaminated impound agricultural water with ferric iron ions, thereby generating a ferric-treated mixture;
    reducing the ferric iron ions to form ferrous iron ions by flowing the ferric-treated mixture through an upflow reactor filled with iron filings or steel wool with a contact time of 10 to 30 minutes, thereby generating a ferrous-treated mixture;
    removing the ferrous-treated mixture from the upflow reactor;
    treating the ferrous-treated mixture with an oxidant, thereby generating an oxidized mixture, wherein the ferrous iron ions catalyze an oxidation activity of the oxidant;
    adding an inorganic coagulant and a low molecular weight cationic polymer to the oxidized mixture to increase a physical size of contaminants and particulates and to form flocculent particles with low tackiness, thereby generating a flocculent mixture; and
    microfiltering the flocculent mixture to remove the flocculent particles, thereby generating a microfilter effluent.

2. The method of claim 1, further comprising removing bulk solids from the flocculent mixture prior to microfiltering.

3. The method of claim 1, further comprising:
    directly processing at least a portion of the microfilter effluent with a first reverse osmosis treatment to generate a first clean water stream and a first reject water stream; directly processing at least a portion of the first reject water stream through a second reverse osmosis treatment to generate a second clean water stream and a second reject water stream;
    oxidizing the second reject water stream; and
    returning the second reject water stream to the contaminated impound water.

4. The method of claim 1, wherein the microfiltering further comprises:
    microfiltering with a microfilter membrane at a back pressure less than about 15 pounds per square inch, wherein the flocculent mixture is treated at a rate of at least 750 gallons per square foot of microfilter membrane per day; and
    periodically backwashing the microfilter membrane to remove collected flocculent particles.

5. The method of claim 1, further comprising microfiltering with a microfilter membrane comprising polypropylene, polysulfone, polyethylene, polytetrafluoroethylene, or combinations thereof.

6. The method of claim 5, wherein the microfilter membrane comprises a pore size between about 0.7 and about 12 microns.

7. The method of claim 5, wherein the microfilter comprises a pore size between about 1 to 2.5 microns.

8. The method of claim 1, wherein the inorganic coagulant is selected from polyaluminum chloride, aluminum sulfate, ferric sulfate, ferric chloride, silicates, dithiocarbamate, and dithiocarbonic acid.

9. The method of claim 1, wherein the low molecular weight cationic polymer comprises a condensation product of epichlorohydrin and dimethyl amine having a molecular weight between 200,000 and 400,000.

10. The method of claim 1, wherein the low molecular weight cationic polymer comprises a condensation product of epichlorohydrin and dimethyl amine having a molecular weight between 250,000 and 350,000.

11. The method of claim 1, wherein the low molecular weight cationic polymer comprises a DADMAC polymer having a molecular weight between 450,000 and 550,000.

12. The method of claim 1, wherein the inorganic coagulant is added to a final concentration of between about 30 mg/L and about 180 mg/L.

13. The method of claim 1, wherein the low molecular weight cationic polymer is added to a final concentration of between about 10 mg/L and about 60 mg/L.

14. The method of claim 1, further comprising adjusting a pH of the flocculent mixture to above about 7 prior to microfiltering.

15. The method of claim 1, further comprising adding an inorganic coagulant to the ferric mixture prior to reducing the ferric iron ions.

16. The method of claim 1, further comprising adjusting the pH of the flocculent mixture to between about 3 and about 12 prior to microfiltering.

17. A method for capturing uranium from uranium-containing impound water, the method comprising:
    providing uranium-containing impound water;
    treating the uranium-containing impound water with ferrous iron ions for between 10 to 30 minutes, thereby generating a ferrous-treated mixture;
    treating the ferrous-treated mixture with an oxidant, thereby generating an oxidized mixture, wherein the ferrous iron ions catalyze an oxidation activity of the oxidant;
    forming uranium-containing flocculent particles of low tackiness by adding an inorganic coagulant and a low molecular weight cationic polymer to the oxidized mixture to increase a physical size of contaminants to form uranium-containing flocculent particles, thereby generating a uranium-containing flocculent mixture; and
    microfiltering the uranium-containing flocculent mixture to capture the uranium-containing flocculent particles as a uranium mixture and to produce a microfilter effluent;

wherein the microfilter effluent comprises at least 99% less uranium than the uranium containing impound water.

18. A method for treating contaminated impound agricultural water, the method comprising:
providing contaminated impound agricultural water containing metal ion and organic species contaminants to be removed;
treating the contaminated impound agricultural water with ferric iron ions, thereby generating a ferric-treated mixture;
reducing the ferric iron ions to form ferrous iron ions by flowing the ferric-treated mixture through an upflow reactor filled with iron filings or steel wool with a contact time of 10 to 30 minutes, thereby generating a ferrous-treated mixture;
removing the ferrous-treated mixture from the upflow reactor;
treating the ferrous-treated mixture with an oxidant, thereby generating an oxidized mixture, wherein the ferrous iron ions catalyze an oxidation activity of the oxidant;
adding polyaluminum chloride and epi-dma (poly(epichlorhydrin-dimethylamine)) to the oxidized mixture to increase a physical size of contaminants and particulates and to form flocculent particles with low tackiness, thereby generating a flocculent mixture; and
microfiltering the flocculent mixture to remove the flocculent particles, thereby generating a microfilter effluent;
wherein the polyaluminum chloride and epi-dma are reacted with the oxidized mixture in a ratio by weight of polyaluminum chloride to epi-dma of 8:1 to 12:1;
wherein the microfiltering is carried out with a microfilter membrane with an average pore size of 1.0 micron nominal size and a 2.2 micron absolute size and wherein more than 99.7% of all flocculent particles are held on a surface of the microfilter membrane.

19. The method of claim 17, further comprising adjusting a pH of the flocculent mixture to above about 7 prior to microfiltering.

20. The method of claim 17, further comprising removing bulk solids from the flocculent mixture prior to microfiltering.

21. The method of claim 17, wherein the low molecular weight cationic polymer comprises a condensation product of epichlorohydrin and dimethyl amine having a molecular weight between 200,000 and 400,000.

22. The method of claim 17, wherein the inorganic coagulant is added to a final concentration of between about 30 mg/L and about 180 mg/L.

23. The method of claim 17, wherein the low molecular weight cationic polymer is added to a final concentration of between about 10 mg/L and about 60 mg/L.

* * * * *